US008930559B2

(12) United States Patent
Chen et al.

(10) Patent No.: US 8,930,559 B2
(45) Date of Patent: Jan. 6, 2015

(54) ADAPTIVE HYPERTEXT TRANSFER PROTOCOL ("HTTP") MEDIA STREAMING SYSTEMS AND METHODS

(75) Inventors: Ming Chen, Bedford, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 250 days.

(21) Appl. No.: 13/486,348

(22) Filed: Jun. 1, 2012

(65) Prior Publication Data
US 2013/0326024 A1    Dec. 5, 2013

(51) Int. Cl.
G06F 15/16    (2006.01)
(52) U.S. Cl.
USPC ............................ 709/230; 709/219; 709/231
(58) Field of Classification Search
USPC .......................... 709/203, 219, 227, 230, 231
See application file for complete search history.

(56) References Cited

U.S. PATENT DOCUMENTS

| | | | | |
|---|---|---|---|---|
| 8,325,764 B2 * | 12/2012 | Frink et al. | ..................... | 370/474 |
| 8,600,220 B2 * | 12/2013 | Bloch et al. | ..................... | 386/296 |
| 8,665,724 B2 * | 3/2014 | Stanwood et al. | ............ | 370/235 |
| 8,745,677 B2 * | 6/2014 | Stanwood et al. | ............... | 725/95 |
| 8,788,933 B2 * | 7/2014 | Hannuksela et al. | ......... | 715/234 |
| 2007/0130498 A1 * | 6/2007 | Hannuksela et al. | ...... | 715/500.1 |
| 2010/0215057 A1 * | 8/2010 | Frink et al. | ..................... | 370/474 |
| 2011/0307339 A1 * | 12/2011 | Russell et al. | ............. | 705/14.66 |
| 2012/0011267 A1 * | 1/2012 | Ma et al. | ........................ | 709/231 |
| 2012/0117225 A1 * | 5/2012 | Kordasiewicz et al. | ....... | 709/224 |
| 2012/0233345 A1 * | 9/2012 | Hannuksela | ................... | 709/231 |
| 2012/0314761 A1 * | 12/2012 | Melnyk et al. | ........... | 375/240.02 |
| 2013/0232233 A1 * | 9/2013 | Reza | .............................. | 709/219 |
| 2013/0259442 A1 * | 10/2013 | Bloch et al. | ................... | 386/230 |
| 2013/0268577 A1 * | 10/2013 | Oyman | ......................... | 709/203 |
| 2013/0275615 A1 * | 10/2013 | Oyman | ......................... | 709/231 |
| 2013/0282917 A1 * | 10/2013 | Reznik et al. | ................. | 709/231 |
| 2013/0286879 A1 * | 10/2013 | ElArabawy et al. | .......... | 370/252 |
| 2013/0290492 A1 * | 10/2013 | ElArabawy et al. | .......... | 709/219 |
| 2013/0290493 A1 * | 10/2013 | Oyman et al. | ................ | 709/219 |
| 2013/0290555 A1 * | 10/2013 | Einarsson et al. | ............ | 709/231 |
| 2013/0291004 A1 * | 10/2013 | Yuan et al. | ....................... | 725/28 |
| 2013/0298170 A1 * | 11/2013 | ElArabawy et al. | ............ | 725/62 |
| 2014/0047123 A1 * | 2/2014 | Oyman | ......................... | 709/231 |

OTHER PUBLICATIONS

Information technology-MPEG technologies-Part6: Dynamic adaptive streaming over HTTP (DASH) Jan. 28, 2011.*

(Continued)

*Primary Examiner* — Sargon Nano

(57) ABSTRACT

An exemplary adaptive Hypertext Transfer Protocol ("HTTP") media streaming system may be configured to stream a media program from an HTTP media streaming server subsystem to a client device during an adaptive HTTP media streaming session in which predefined segments of the media program are progressively downloaded from the HTTP media streaming server subsystem to the client device by way of a network connection. For each next predefined segment of the media program to be downloaded, the server subsystem may dynamically select, based on one or more of the exemplary factors disclosed herein, a version of the next predefined segment of the media program from a plurality of versions of the next predefined segment of the media program and download the selected version of the next predefined segment of the media program to the client device. Corresponding methods and systems are also disclosed.

25 Claims, 11 Drawing Sheets

(56) References Cited

OTHER PUBLICATIONS

Alex Zambelli, IIS Smooth Streaming Technical Overview, 17 pages, http://www.microsoft.com/download/en/details.aspx?displaylang=en&id=17678, Mar. 2009, Microsoft Corporation.

Apple Inc., Http live streaming overview, 36 pages, https://developer.apple.com/library/mac/#documentation/NetworkingInternet/Conceptual/StreamingMediaGuide/Introduction/Introduction.html, Apr. 1, 2011.

Adobe Inc., Open source media framework, 2 pages, http://osmf.org/, Feb. 2010.

ISO/IEC, Information technology—MPEG systems technologies—Part 6: Dynamic adaptive streaming over HTTP (DASH), 86 pages, ISO/IEC 23001-6, http://www.iso.org/iso/iso_catalogue/catalogue_tc/catalogue_detail.htm?csnumber=57623, Jan. 28, 2011.

Saamer Akhshabi et al., An Experimental Evaluation of Rate-Adaptation Algorithms in Adaptive Streaming over HTTP, 12 pages, Feb. 2011.

* cited by examiner

ADAPTIVE HYPERTEXT TRANSFER PROTOCOL ("HTTP") MEDIA STREAMING SYSTEMS AND METHODS

BACKGROUND INFORMATION

Methods for delivering media over a network, such as methods for delivering video over the Internet, are traditionally broken down into two categories—streaming and downloading. Real Time Streaming Protocol ("RTSP") and Real Time Messaging Protocol ("RTMP") are two popular transport protocols used for streaming video, while Hypertext Transfer Protocol ("HTTP") is typically used for downloading video.

A recent trend in industry is to divide an entire video program into small video segments referred to as "video chunks" and rely on HTTP to transport those chunks from a video server to a client device. The client device issues pull requests to the video server to progressively request and download the video chunks from the video server. While the client device is downloading new video chunks, the client device may play back previously downloaded video chunks.

This download scheme, which is known as "HTTP progressive download," has advantages over the use of traditional video streaming transport protocols such as RTSP and RTMP. For example, the HTTP progressive download scheme allows (1) use of network infrastructure that is optimized for HTTP traffic, (2) easy and effortless traversal of Network Address Translation ("NAT") and firewall functionality, (3) comparatively less expensive transport of video data to edges of a network using standard HTTP servers and caches, and (4) use of variable bit rate ("VBR") encoding of video to improve coding efficiency and conserve bandwidth.

Although the HTTP progressive download scheme has become an increasingly popular alternative to traditional media streaming protocols, it has shortcomings. For example, the HTTP progressive download scheme is not bit rate adaptive and does not adapt the progressive downloads to fit changing network conditions. Consequently, a client device has to download and buffer chunks of a video for a long time before playback of the video can be started without the risk of playback freezes and re-buffering that may be caused by insufficient and/or changing network conditions (e.g., changing availability of network resources such as network bandwidth).

Adaptive HTTP video streaming, which some consider to be a hybrid of the HTTP progressive download scheme and traditional streaming, has been introduced. Unlike the HTTP progressive download scheme, adaptive HTTP video streaming allows a client device to request to download different versions of a video encoded with different bit rates and/or resolutions. For example, two different versions of a video having different bit rates and/or resolutions may be maintained by a video server for access by client devices. As part of adaptive HTTP video streaming, a client device may determine, for each new video chunk included in the video and to be downloaded, which version of the video chunk to request and download from the video server. To determine which version of the video chunk to request, the client device employs a client video rate adaption heuristic configured to determine, based on parameters of the client device such as client device decoding and/or rendering capabilities, which version of the video chunk to request and download from the video server.

However, conventional adaptive HTTP video streaming technologies also have shortcomings. For example, conventional adaptive HTTP video streaming technologies have slow response times to changes in network conditions such as shifts in network congestion, make rate adaptation decisions at the client device based on limited information, and/or tend to be biased to be either too aggressive or too conservative in rate adaptation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
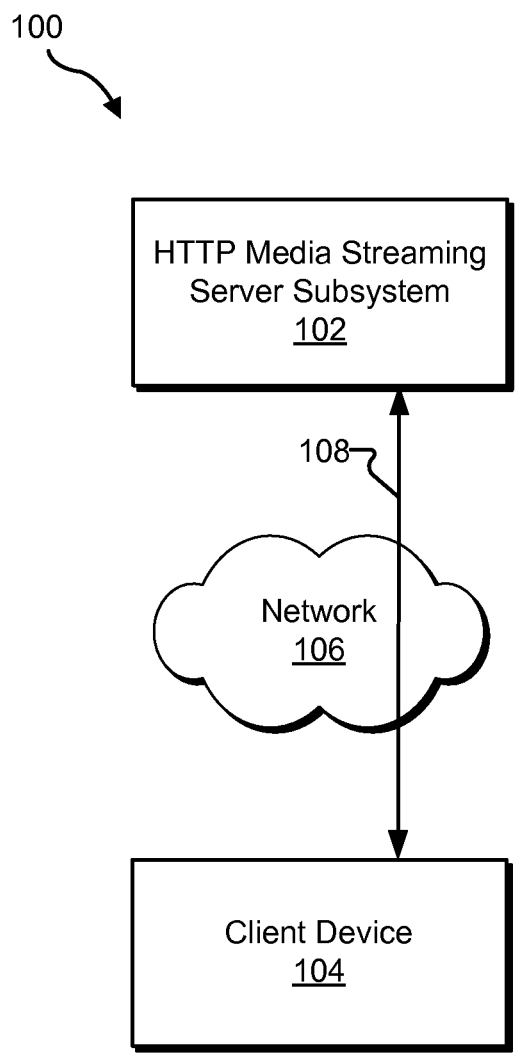
FIG. 1 illustrates an exemplary adaptive HTTP media streaming system according to principles described herein.

Exemplary adaptive HTTP media streaming systems and methods are described herein. As will be described below, an adaptive HTTP media streaming system may be configured to stream a media program from an HTTP media streaming server subsystem to a client device during an adaptive HTTP media streaming session in which predefined segments of the media program are progressively downloaded from the HTTP media streaming server subsystem to the client device by way of a network connection. As described herein, for each next predefined segment of the media program to be downloaded, the HTTP media streaming server subsystem may select a version of the next predefined segment of the media program from a plurality of versions of the next predefined segment of the media program and download the selected version of the next predefined segment of the media program to the client device. The plurality of versions of the next predefined segment of the media program may include versions of the segment that have different levels of quality, such as different bit rates and/or resolutions. Accordingly, the selection of a version of the segment to download to the client device may include a selection of a version having a particular bit rate and/or resolution for download and that, based on the bit rate and/or resolution, may take a particular amount of time to download given a particular network throughput.

The HTTP media streaming server subsystem may be configured to select the version of the next predefined segment of the media program in accordance with a predefined rate adaptation heuristic that specifies one or more factors on which the selection is based. In certain examples, the selection may be based, at least in part, on parameter information associated with the adaptive HTTP media streaming session and received from the client device. In some examples, the parameter information may specify a buffer level of a buffer used by the client device to buffer data representative of the predefined segments of the media program progressively downloaded to the client device during the adaptive HTTP media streaming session. For example, the buffer level may include an amount of buffer memory between a download position and a playback position associated with the buffer.

Additionally or alternatively, the parameter information may include endpoint-to-endpoint network performance information determined and provided to the HTTP media streaming server subsystem by the client device. In some examples, the endpoint-to-endpoint network performance information may indicate at least one of packet delay and packet loss between the HTTP media streaming server subsystem and the client device during the adaptive HTTP media streaming session.

Additionally or alternatively, the parameter information may include playback information associated with the adaptive HTTP media streaming session. For example, the playback information may specify one or more user-directed playback operations such as jumping forward, jumping backward, pausing, etc. that have been performed during the adaptive HTTP media streaming session.

Additionally or alternatively, in certain examples, the selection of the version of the next predefined segment of the media program may be based, at least in part, on predicted transport layer throughput associated with the network connection. The HTTP media streaming server subsystem may be configured to predict future transport layer throughput associated with the network connection in any suitable way, such as by determining and using performance information for the network connection to predict the transport layer throughput. In certain examples, the performance information may indicate at least one of packet loss and packet delay associated with the network connection and measured by the HTTP media streaming server subsystem, by at least one network device disposed along the network connection between the HTTP media streaming server subsystem and the client device, and/or by the client device.

In certain examples, the prediction of transport layer throughput may be based, at least in part, on historical transport layer throughput associated with the network connection. The HTTP media streaming server subsystem may be configured to maintain and use data representative of a transport layer throughput history associated with the network connection to predict future transport layer throughput associated with the network connection.

By basing a selection of a version of a next segment of a media program on at least one of parameter information provided by the client device and predicted transport layer throughput during an adaptive HTTP media streaming session as described herein, the adaptive HTTP media streaming systems and methods described herein may improve the quality of experience had by a user in streaming media over a network such as the Internet, as compared to the quality of experience provided by conventional adaptive HTTP media streaming technologies. For example, the adaptive HTTP media streaming systems and methods described herein may improve capabilities for adapting media streaming operations to changes in network conditions such as by improving adaptation response times to changes in network conditions such as shifts in network congestion. Additionally or alternatively, the adaptive HTTP media streaming systems and methods described herein may allow rate adaptation decisions to be made based on robust information, such as parameter information and/or network performance information provided by a client device, network performance information determined by an adaptive HTTP media streaming server subsystem, and/or network performance information determined and provided by one or more other intermediary network devices.

Exemplary adaptive HTTP media streaming systems and methods will now be described with reference to the drawings.

FIG. 1 illustrates an exemplary adaptive HTTP media streaming system 100 ("system 100"). As shown, system 100 may include an HTTP media streaming server subsystem 102 ("media server subsystem 102") and a client device 104 in communication with one another.

Media server subsystem 102 and client device 104 may communicate using any communications technologies suitable for supporting communications and data transfers associated with adaptive HTTP media streaming from media server subsystem 102 to client device 104, such as described herein. Examples of such communication technologies include, without limitation, Transmission Control Protocol ("TCP"), other suitable transport layer protocols, Internet Protocol ("IP"), Hypertext Transfer Protocol ("HTTP"), other suitable communications technologies, and/or any combination or sub-combination thereof.

In certain implementations, communications and/or data transfers between media server subsystem 102 and client device 104 may be by way of a network 106, which may include any suitable network or combination of networks provided by one or more appropriately configured network devices (and communication links thereto) and over which communications and data may be transported between media server subsystem 102 and client device 104. For example, network 106 may include a mobile phone network (e.g., a cellular phone network), a mobile data network (e.g., a 3G network, a 4G network, etc.), a telecommunications network, a wide area network (e.g., the Internet, a WiMax network, a mobile data network, etc.), a local area network (e.g., a home wired network such as an Ethernet network and/or a home wireless network such as a Wi-Fi network), an Internet service provider ("ISP") network, a content delivery network, any other network capable of transporting communications and data between media server subsystem 102 and client device 104 as described herein, and/or any combination or sub-combination thereof.

Media server subsystem 102 may include one or more media streaming server devices configured to use adaptive HTTP streaming to stream media to client device 104. For example, media server subsystem 102 may include a media server that is a source of media, a media server that is part of a content delivery network (e.g., a server and/or cache located at an edge of a content delivery network), and/or any other media server configured to operate as described herein.

Client device 104 may include a computing device (e.g., a mobile device, a smartphone, a computer, a tablet computer, a set-top box, a gaming device, etc. operated by a user) configured to function as a client to receive streamed media from media server subsystem 102 and to operate as described herein.

Media server subsystem 102 and client device 104 may be configured to establish an adaptive HTTP media streaming session during which predefined segments of a media program may be progressively downloaded from media server subsystem 102 to client device 104. The session may be established in any suitable way, such as by media server subsystem 102 and client device 104 exchanging messages to set up the session in response to client device 104 sending a request to media server subsystem 102 to stream the media program.

The session may have any suitable start and end points. For example, the session may be defined to begin with a request from client device 104 to stream a media program and end with a final transmission from media server subsystem 102 to client device 104 such as a message from media server subsystem 102 indicating that media server subsystem 104 has completed streaming the media program and/or is terminating the session.

The session may comprise any type of session suitable for adaptive HTTP media streaming. For example, the session may include a live streaming session for streaming of a media program in accordance with a predefined transmission schedule (e.g., a broadcast, multicast, or narrowcast schedule). As another example, the session may include a media-on-demand session for streaming of a media program on demand. During an established session, segments of the media program may be progressively downloaded from media server subsystem 102 to client device 104 by way of a network connection 108 over network 106.

In addition, during the established session, media server subsystem 102 and client device 104 may exchange one or more communications by way of network connection 108 and/or another connection over network 106, including any communications used to share information between media server subsystem 102 and client device 104 as described herein. Network connection 108 may include any communication and/or data path between media server subsystem 102 and client device 104 by way of network 106.

Figure 2:
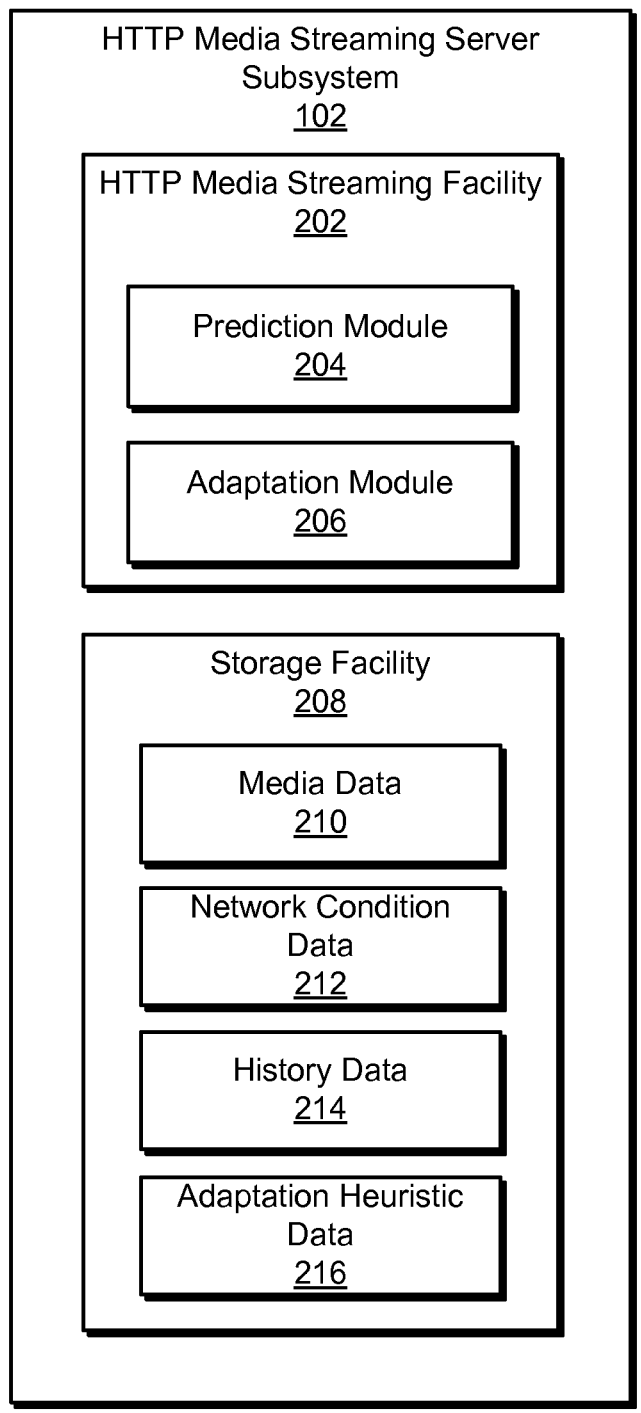
FIG. 2 illustrates exemplary components of an HTTP media streaming server subsystem according to principles described herein.

FIG. 2 illustrates exemplary components of media server subsystem 102. As shown, media server subsystem 102 may include, without limitation, an HTTP media streaming facility 202 ("streaming facility 202") that includes a prediction module 204 and an adaptation module 206, and a storage facility 208 that stores media data 210, network condition data 212, history data 214, and adaptation heuristic data 216. Components of media server subsystem 102 may be selectively and communicatively coupled to one another in any suitable way. It will be recognized that although components of media server subsystem 102 are shown to be separate components in FIG. 1, any of the components may be combined into fewer components, such as into a single component, or divided into more components as may serve a particular implementation.

Streaming facility 202 may be configured to perform one or more operations to establish an adaptive HTTP media streaming session with client device 104, progressively download predefined segments of a media program to client device 104 during the session, and otherwise communicate with client device 104 during the session. For example, media server subsystem 102 may receive a request from client device 104 to stream a media program. In response, streaming facility 202 may perform one or more operations to establish an adaptive HTTP media streaming session with client device 104 and to progressively download predefined segments of the media program to client device 104 during the session.

Data representative of the media program may be maintained by media server subsystem 102 for use in streaming the media program. For example, data representative of the media program may be stored as media data 210 in storage facility 208. To support adaptive HTTP streaming of the media program, media data 210 may include data representative of multiple different versions of the media program. Each version of the media program may have different attributes such as different bit rates (e.g., video rates and/or audio rates) and/or video resolutions, and thus a different level of quality. For example, a first version of a video program having a first resolution (e.g., 720p) may have a first bit rate, and a second version of the video program having a second resolution (e.g., 480p) may have a second bit rate. Because the second resolution is lower than the first resolution, the second bit rate may lower than the first bit rate. Accordingly, for a given network throughput, the second version of the video program may be streamed in less time than the first version of the video program.

Figure 3:
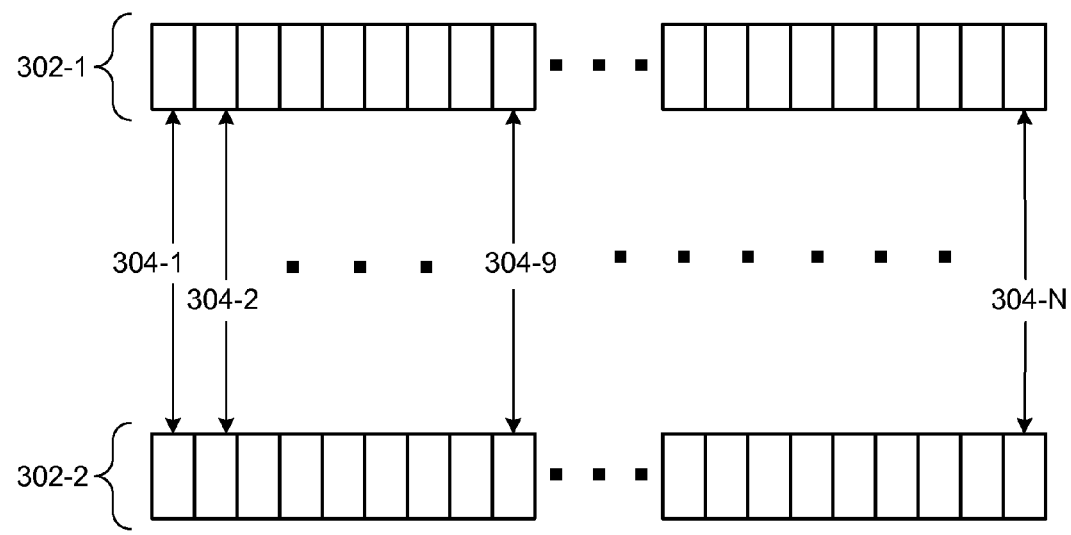
FIG. 3 illustrates exemplary versions of a media program segmented for adaptive HTTP media streaming according to principles described herein.

Each version of the media program may include a plurality of predefined segments of the media program that are temporally aligned across the different versions. To illustrate, FIG. 3 shows data representing exemplary versions 302 (e.g., versions 302-1 and 302-2) of the same media program. As used herein, the term "media" may refer to any media (e.g., video, audio, multimedia) designed for linear streaming and playback. The term "media program" may refer to a specific instance of linear media such as a video program (e.g., a movie, a television show, etc.), an audio program (e.g., a song, an audio book, etc.), or other multimedia program.

Versions 302 of the media program may have different attributes. For example, version 302-1 of the media program may include a video program having a resolution of 720p and a bit rate that corresponds to this resolution, and version 302-2 of the media program may include a video program having a resolution of 480p and a bit rate that corresponds to this resolution and is lower than the bit rate of version 302-1 of the media program.

As shown in FIG. 3, versions 302 of the media program each include a plurality of predefined segments 304 (e.g., segments 304-1 through 304-N) of the media program. Segments 304 may be defined in any suitable way such that each segment 304 includes a different portion of the media program. Segments 304 of the media program are temporally aligned across the different versions 302 of the media program. For example, the version of segment 304-1 included in version 302-1 of the media program is temporally aligned with the version of segment 304-1 included in version 302-2 of the media program, the version of segment 304-2 included in version 302-1 of the media program is temporally aligned with the version of segment 304-2 included in version 302-2 of the media program, and so on. This temporal alignment allows for a seamless transition from completing playback of one version of a predefined segment of the media program to beginning playback of a different version of a next sequential predefined segment of the media program. For example, a transition from playback of the version of segment 304-1 included in version 302-1 of the media program to playback of the version of the next sequential segment 304-2 of the media program included in version 302-2 of the media program may be performed seamlessly such that a user viewing the playback will not experience a temporal gap or repetition in the playback of the content of the media program.

During an adaptive HTTP media streaming session in which predefined segments of the media program are progressively downloaded from media server subsystem 102 to client device 104, media server subsystem 102 may dynamically select which version of each of the segments of the media program to download to client device 104. As segments of the media program are progressively processed, a version of a next segment of the media program to be processed may be selected, from the multiple versions of the segment, by streaming facility 202 for processing (e.g., downloading to client device 104). To illustrate, if segment 304-1 is the last segment of the media program subjected to processing by streaming facility 202, segment 304-2 is the next sequential segment of the media program to be processed (e.g., to be downloaded). Streaming facility 202 may select either version of segment 304-2 of the media program to be the next segment of the media program to be subjected to processing. Such a selection may be made for each predefined segment of the media program for which multiple versions are maintained.

The selection of a version of a next segment for processing may be performed by adaptation module 206 of streaming facility 202 in accordance with a predefined rate adaptation heuristic that specifies one or more factors on which the selection is based. Adaptation module 206 may maintain data representative of the rate adaptation heuristic as adaptation heuristic data 216 stored in storage facility 208. The rate adaptation heuristic may be designed to maximize the quality of media streamed subject to one or more constraints of network 106, network connection 108, media server subsystem 102, and/or content device 104. For example, the rate adaptation heuristic may be configured to direct adaptation module 206 to select a highest quality version of a predefined segment of a media program that is available and that can be downloaded to content device 104 without risking or causing playback freezes, re-buffering, and/or other undesirable streaming events given current and/or predicted network, content device, playback, and/or other conditions and/or events. The rate adaptation heuristic may be configured to direct adaptation module 206 to select a version of a predefined segment of a media program based on any of the factors disclosed herein, or any combination or sub-combination thereof.

Once a version of a predefined segment of a media program is selected by adaptation module 206 in any of the ways described herein, streaming facility 202 may download the selected version of the predefined segment to content device 104. The downloading may include any HTTP transmission of data representative of the selected version of the predefined segment by media server subsystem 102 and directed to content device 104.

Exemplary factors that may be specified by the rate adaptation heuristic and used by adaptation module 206 to select a version of a predefined segment of a media program will now be described. Any of the exemplary factors may be used alone or in combination with any of the other factors by adaptation module 206 to select a version of a predefined segment of a media program.

In certain examples, a selection may be based, at least in part, on parameter information associated with an adaptive HTTP media streaming session and received by media server subsystem 102 from client device 104. The parameter information may include any information related to the adaptive HTTP media streaming session between media server subsystem 102 and client device 104 and provided by client device 104 to media server subsystem 102.

Figure 4:
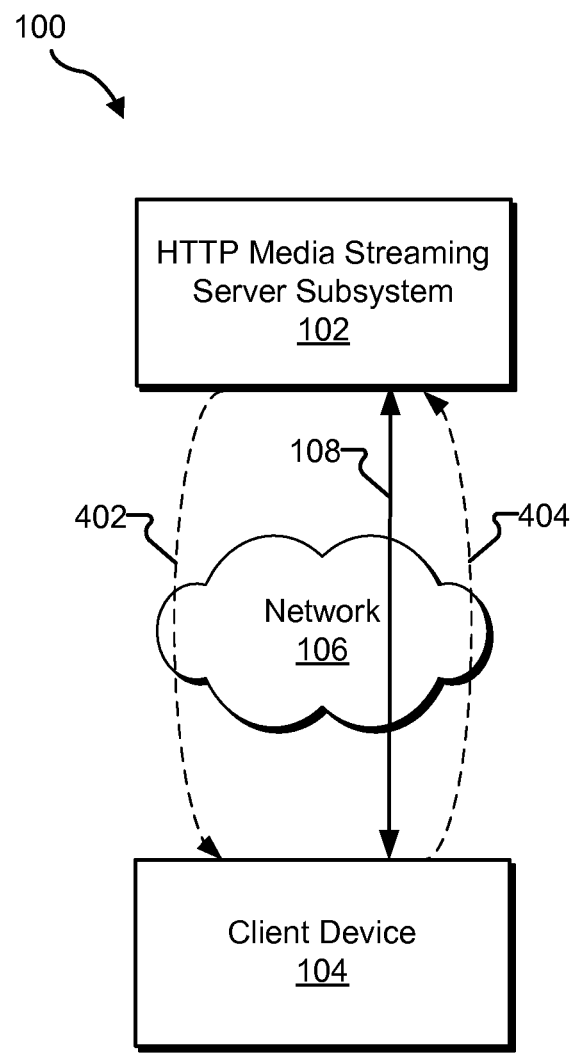
FIG. 4 illustrates a closed-loop configuration of the system of FIG. 1 according to principles described herein.

FIG. 4 illustrates media server subsystem 102 and client device 104 engaged in an adaptive HTTP media sharing session during which media server subsystem 102 progressively downloads predefined segments of a media program to client device 104 over network connection 108 as represented by arrow 402 and client device 104 sends parameter information associated with the session to media server subsystem 102 by way of network 106 (e.g., by way of network connection 108 or a different network connection) as represented by arrow 404. The configuration shown in FIG. 4 may be referred to a closed-loop configuration in which client device 104 continually sends parameter information to media server subsystem 102 during the session for use by media server subsystem 102 to select, for each next predefined segment of the media program, a version of the next predefined segment of the media program to download to client device 104 and thereby dynamically control (e.g., adapt) the quality of media downloaded to client device 104 during the session.

By client device 104 providing parameter information to media server subsystem 102 in this manner, media server subsystem 102 may access and use robust information to dynamically control (e.g., adapt) the quality of media downloaded to client device 104 during the session. This promotes intelligent, server-side rate adaptation control based on robust information, as compared to a client device making a selection decision based on limited information and simply providing a pull request that specifies only a version of a media program as is common in conventional adaptive HTTP streaming technologies. In particular, media server subsystem 102 is able to base a selection of a version of the next predefined segment of the media program on parameter information received from client device 104 and on additional information determined, maintained, and/or accessed by media server subsystem 102, as described herein.

The parameter information sent to media server subsystem 102 by client device 104 may include any information that is related to the active adaptive HTTP media streaming session and determined, maintained, and/or accessed by client device 104. For example, the parameter information may include, without limitation, buffer level information indicating a buffer level of a buffer used by client device 104 to buffer data representative of predefined segments of the media program progressively downloaded to client device 104 during the session, buffer size information indicating an overall size of a buffer used by client device 104 to buffer data representative of predefined segments of the media program progressively downloaded to client device 104 during the session, endpoint-to-endpoint network performance information determined by client device 104 (e.g., end-to-end packet loss, packet delay, etc.), media playback rate information, media playback event information indicating media playback events such as jumps forward, jumps backward, pauses, and/or other playback operations, or any combination or sub-combination thereof.

Figure 5:
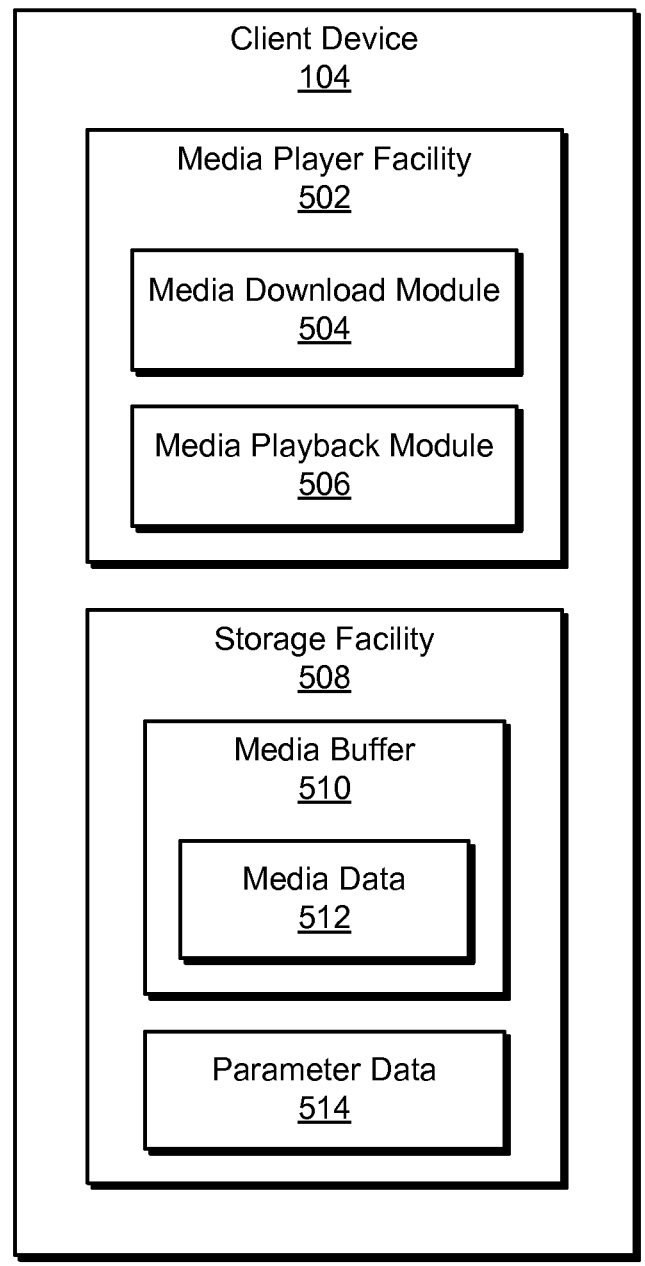
FIG. 5 illustrates exemplary components of a client device according to principles described herein.

To help illustrate these and/or other examples of parameter information that may be sent by client device 104 to media server subsystem 102 during an adaptive HTTP media streaming session for use by media server subsystem 102 to select versions of predefined segments of a media program to download, exemplary components and operations of client device 104 will now be described with reference to FIG. 5. As shown in FIG. 5, client device 104 may include, without limitation, a media player facility 502 that includes a media download module 504 and a media playback module 506, and a storage facility 508 that includes a media buffer 510 and stores media data 512 and parameter data 514. Components of client device 104 may be selectively and communicatively coupled to one another in any suitable way. It will be recognized that although components of client device 104 are shown to be separate components in FIG. 1, any of the components may be combined into fewer components, such as into a single component, or divided into more components as may serve a particular implementation.

Media player facility 502 may be configured to receive an adaptive HTTP media stream from media server subsystem 102 and play back the media stream for experiencing by a user of client device 104. The streaming may include media download module 504 progressively downloading predefined segments of a media program from media server subsystem 102 during an adaptive HTTP media streaming session between client device 104 and media server subsystem 102. The downloaded segments of the media program may be buffered as media data 512 stored in media buffer 510 of storage facility 508.

Media playback module 506 may be configured to play back downloaded segments of the media program stored in media buffer 510. The downloading performed by media download module 504 and the playback performed by media playback module 506 may be decoupled in that each may they be stopped or continued independently of the other and/or performed at download and playback rates that are independent of one another.

Media player facility 502 may be further configured to send parameter information associated with the adaptive HTTP media streaming session to media server subsystem 102. The parameter information may be determined, maintained, and/or accessed by media player facility 502 in any suitable way. In certain examples, parameter data 514 representative of the parameter information may be stored in storage facility 508.

Figure 6:
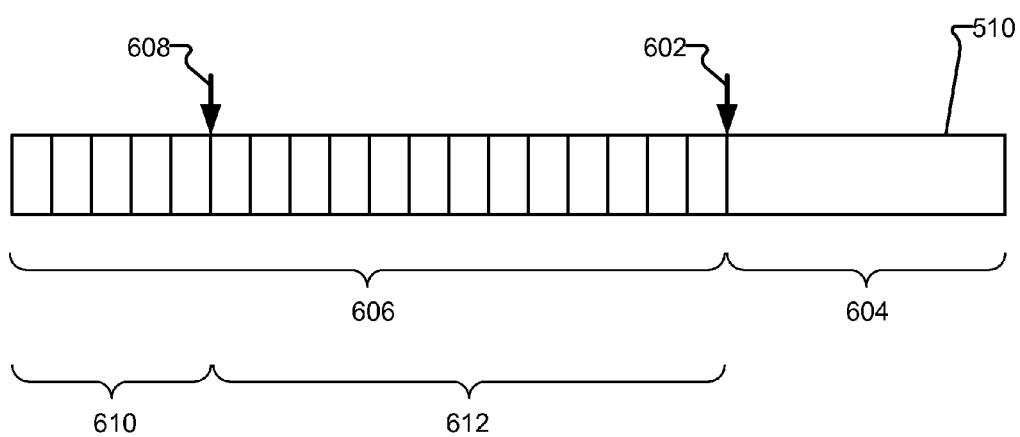
FIG. 6 illustrates an exemplary state of a buffer of a client device streaming a media program according to principles described herein.

In certain examples, the parameter information may include buffer information descriptive of a buffer and/or a state of a buffer used by client device 104 to buffer data representative of the predefined segments of the media program progressively downloaded during the adaptive HTTP media streaming session. For example, the parameter information may indicate an overall size of media buffer 510. As another example, the parameter information may indicate a state of buffer 510, such as a buffer level that specifies an amount of buffer memory that exists between a current download position and a current playback position of buffer 510. To illustrate, FIG. 6 shows an exemplary state of buffer 510 during an active adaptive HTTP media streaming session. In FIG. 6, a download marker 602 indicates a current download position in buffer 510. Download marker 602 points to a position at which a next predefined segment of the media program will be downloaded and stored in buffer 510. The space in buffer 510 to the right of download marker 602 and spanned by bracket 604 indicates empty memory space in buffer 510 and/or the next memory space to be used to store downloaded media in buffer 510, and the space to the left of download marker 602 and spanned by bracket 606 indicates memory space of buffer 510 that has been used to store progressively downloaded segments of the media program. As progressive downloading continues, download marker 602 moves to the right along buffer 510 at a download rate.

As further illustrated in FIG. 6, a playback marker 608 indicates a current playback position in buffer 510. Playback marker 608 points to a position at which playback of the media program is currently located. As playback of the media program continues, playback marker 608 moves to the right along buffer 510 at a playback rate. The space in buffer 510 to the left of playback marker 608 and spanned by bracket 610 indicates memory space of buffer 510 that stores segments of the media program that have been both downloaded and played back. The space in buffer 510 between playback marker 608 and download marker 602 indicates memory space of buffer 510 that stores segments of the media program that have been downloaded but not yet played back. This space represents a buffer level 612 of buffer 510. Hence, the buffer level 612 of buffer 510 may comprise an amount of buffer memory between a download position and a playback position of buffer 510.

As download marker 602 and playback marker 608 move along buffer 510 at different rates, the size of buffer level 612 fluctuates over time. Media player facility 502 may continually send buffer level information to media server subsystem 102 such that media server subsystem 102 may detect changes in the size of buffer level 612 over time during an adaptive HTTP media streaming session.

Media server subsystem 102 may receive buffer level information from client device 104 and use the buffer level information to select an appropriate version of the next predefined segment of the media program to be downloaded to content device 104. To illustrate, if the size of buffer level 612 satisfies a predefined buffer level size threshold and/or is increasing in size over time (indicating that the download rate is outpacing the playback rate), adaptation module 206 may determine that sufficient resources are available to select higher quality version 302-1 instead of lower quality version 302-2 of the next predefined segment of the media program for download (because sufficient resources are available to support download of high quality video). Alternatively, if the size of buffer level 612 fails to satisfy the predefined buffer level size threshold and/or is decreasing in size over time (indicating that the playback rate is outpacing the download rate and/or that available resources will not support the current download rate), adaptation module 206 may determine that insufficient resources are available to select higher quality version 302-1 of the next predefined segment of the media program and will instead select lower quality version 302-2 of the next predefined segment of the media program for download.

In certain examples, the parameter information provided by client device 104 to media server subsystem 102 may include endpoint-to-endpoint network performance information determined by client device 104. For example, the parameter information may include information indicative of at least one of packet delay, packet loss, and transport layer window sizes for sending and/or receiving (e.g., TCP window sizes for sending and/or receiving) between media server subsystem 102 and client device 104 during the adaptive HTTP media streaming session. Client device 104 may determine such information in any suitable way, such as by using timestamp information, packet identifier information, and/or any other information included in packets sent by media server subsystem 102 and received by client device 104 to determine endpoint-to-endpoint network performance information associated with network connection 108.

Media server subsystem 102 may receive endpoint-to-endpoint network performance information from client device 104 and use the endpoint-to-endpoint network performance information (packet loss, packet delay, and/or transport layer window sizes) to select an appropriate version of the next predefined segment of the media program to be downloaded to content device 104. To illustrate, if end-to-end packet delay satisfies a predefined delay threshold, adaptation module 206 may determine that sufficient network resources are available to select higher quality version 302-1 instead of lower quality version 302-2 of the next predefined segment of the media program for download. Alternatively, if the end-to-end packet delay fails to satisfy the predefined delay threshold, adaptation module 206 may determine that insufficient network resources are available to select higher quality version 302-1 of the next predefined segment of the media program and will instead select lower quality version 302-2 of the next predefined segment of the media program for download.

In certain examples, the parameter information provided by client device 104 to media server subsystem 102 may include playback information determined by client device 104. For example, the parameter information may include information indicative of a playback rate and/or events associated with the adaptive HTTP media streaming session. Playback information may represent events such as jumps forward, jumps backward, pauses, and/or other playback operations associated with playback of the media program being streamed.

Media server subsystem 102 may receive playback information from client device 104 and use the playback information to select an appropriate version of the next predefined segment of the media program to be downloaded to content device 104. To illustrate, if the playback information indicates that the user has a history of jumping playback forward in the active session, adaptation module 206 may select lower quality version 302-2 instead of higher quality version 302-1 of the next predefined segment of the media program for download to minimize the risk of a playback freeze occurring due to the user jumping playback forward to the point that playback marker 608 catches up to download marker 602 in buffer 510.

As an example, a media program may include a football game, and the user may repeatedly jump playback forward to skip over a team's defensive possessions and watch only the team's offensive possessions at a normal playback rate. Media server subsystem 102 may receive playback information indicating that the user has repeatedly and periodically jumped playback forward during the session and use this information to select lower quality version 302-2 instead of higher quality version 302-1 of the next predefined segment of the media program for download to minimize the risk of a playback freeze occurring due to the user jumping playback forward to the point that playback marker 608 catches up to download marker 602 in buffer 510.

In certain alternative embodiments, client device 104 may be configured to select a version of a next predefined segment of a streaming media program to request from mss 102 and to send a request for the selected version to mss 102. Client device 104 may be configured to select the version in any suitable way. For example, client device 104 may select the version based at least in part on a prediction of available network bandwidth made by client device 104.

Adaptation module 206 may be configured to use the request for a specific version of the next predefined segment of the media program received from client device 104 to intelligently select which version of the next predefined segment of the media program to provide in response to the request. Mss 102 may be configured to consider the request received from client device 104 in any suitable way and based on any additional information available to mss 102, such as predicted transport layer throughput that may be determined by mss 102 as described herein. Mss 102 may select to override the request and provide a different version of the next predefined segment of the media program to client device 104 based on additional information available to mss 102. Alternatively, mss 102 may select to forward the request from one server device to another server device that may be able to fulfill the request from client device 104. Alternatively, mss 102 may select to perform another action based on the request and on additional information available to mss 102. Because of the more global perspective of the mss 102 compared to client device 104, mss 102 may be in an advantageous position to select which version of the next predefined segment of the media program to provide to client device 104 in response to the request received from client device 104.

Returning to FIG. 2, in certain examples, a selection of a version of a next predefined segment of a media program by adaptation module 206 may be based, at least in part, on predicted transport layer throughput associated with network connection 108. To this end, prediction module 204 of streaming facility 202 may be configured to predict future transport layer throughput associated with network connection 108.

Transport layer throughput may comprise a volume of data transported by a transport layer of network 106 in a given amount of time. In certain examples, the adaptive HTTP streaming described herein may use TCP as an underlying transport protocol. In such examples, transport layer throughput may comprise TCP throughput. Other suitable transport protocols may be used in other examples.

The amount of time required to download a predefined segment of a media program over network connection 108 is determined by the size of the segment and the transport layer throughput available under current network conditions. To help adaptation module 206 select which version of the predefined segment (and thus the size of the predefined segment) to download, prediction module 204 may predict transport layer throughput and/or the amount of time required to download each version of the predefined segment based on the predicted transport layer throughput.

The prediction may be made in any suitable way. In certain examples, for instance, prediction module 204 may be configured to determine and use network condition information (e.g., available network bandwidth) to predict future transport layer throughput. For example, prediction module 204 may be configured to determine and use performance information for network connection 108 to predict future transport layer throughput. In some examples, the performance information may indicate at least one of packet loss, packet delay, and transport layer window sizes associated with network connection 108 and measured by media server subsystem 102, by at least one intermediary network device disposed along network connection 108 between media server subsystem 102 and client device 104, by client device 104, and/or by an additional client device that shares at least some resources of network connection 108 with client device 104.

For example, prediction module 204 may be configured to determine performance information for network connection 108 by measuring packet loss, packet delay, and/or transport layer window sizes associated with network connection 108. Prediction module 204 may use the determined information to predict the transport layer throughput associated with network connection 108.

Additionally or alternatively, prediction module 204 may be configured to determine performance information for network connection 108 based on endpoint-to-endpoint packet loss, packet delay, and/or transport layer window sizes associated with network connection 108 and measured and provided to media server subsystem 102 by client device 104. In such examples, the determination of performance information may include prediction module 204 receiving, from client device 104, performance information indicating endpoint-to-endpoint packet loss, packet delay, and/or transport layer window sizes associated with network connection 108. Prediction module 204 may use the determined information to predict the transport layer throughput associated with network connection 108.

Figure 7:
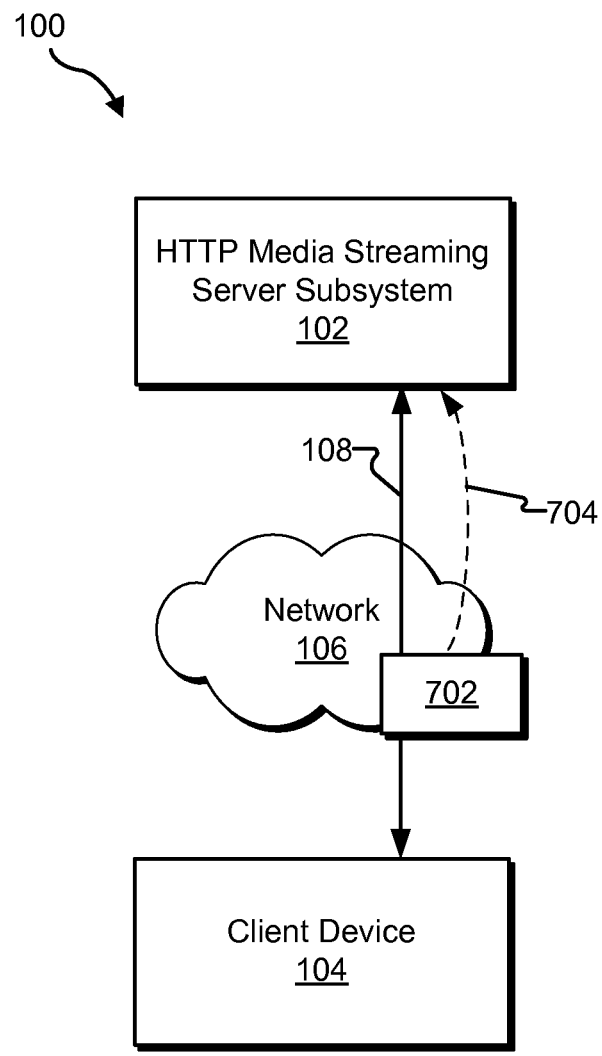
FIG. 7 illustrates a configuration of the system of FIG. 1 in which an intermediary network device provides information to an HTTP media streaming server subsystem according to principles described herein.

Additionally or alternatively, prediction module 204 may be configured to determine performance information for network connection 108 based on packet loss, packet delay, and/or transport layer window sizes associated with network connection 108 and measured and provided to media server subsystem 102 by at least one intermediary network device disposed along network connection 108 between media server subsystem 102 and client device 104. To illustrate, FIG. 7 shows system 100 to include a network device 702 positioned along network connection 108 between media server subsystem 102 and client device 104. Network device 702 may be configured to measure conditions of network connection 108 and/or network 106, such as packet loss, packet delay, and/or transport layer window sizes along network connection 108, and to provide information indicating the measured conditions to media server subsystem 102. In such examples, prediction module 204 may determine performance information associated with network connection 108 by receiving, from network device 702, performance information indicating packet loss, packet delay, and/or transport layer window sizes associated with network connection 108. Prediction module 204 may use the determined information to predict the transport layer throughput associated with network connection 108.

Additionally or alternatively, prediction module 204 may be configured to determine performance information for network connection 108 based on packet loss, packet delay, and/or transport layer window sizes associated with network connection 108 and measured and provided to media server subsystem 102 by at least one additional client device that shares at least some resources of network connection 108 with client device 104. To illustrate, an additional client device may be configured to measure conditions of network connection 108 and/or network 106, such as packet loss, packet delay, and/or transport layer window sizes along at least a portion of network connection 108 (e.g., a portion shared with client device 104), and to provide information indicating the measured conditions to media server subsystem 102. In such examples, prediction module 204 may determine performance information associated with network connection 108 by receiving, from the additional client device, performance information indicating packet loss, packet delay, and/or transport layer window sizes associated with network connection 108. Prediction module 204 may use the determined information to predict the transport layer throughput associated with network connection 108.

Network performance information determined by prediction module 204 may be stored as network condition data 212 in storage facility 208 as shown in FIG. 2.

Prediction module 204 may be configured to use determined current, real-time network performance information in any suitable way to predict future transport layer throughput. In certain implementations, for example, prediction module 204 may include a support vector machine ("SVM") model configured to predict future transport layer throughput based on measured packet loss and delay. The model may be predefined based on historical packet loss, packet delay, and transport layer throughput. In certain examples, the model may employ machine learning to adapt to updated historical information about packet loss, packet delay, and transport layer throughput.

Accordingly, changes in network conditions may be detected by prediction module 204 in real time and used to predict transport layer throughput that will be available for downloading predefined segments of a media program. This allows for effective adaptation response times to changing network conditions (e.g., changing congestion levels along network connection 108). The prediction may take into account all network traffic that affects network connection 108, including cross traffic (i.e., traffic other than that between media server subsystem 102 and client device 104).

In certain examples, the prediction of transport layer throughput may be based, at least in part, on historical transport layer throughput associated with network connection 108 and/or network 106. Media server subsystem 102 may be configured maintain and use data representative of historical transport layer throughput associated with network connection 108 and/or network 106 to predict future transport layer throughput associated with network connection 108. In some examples, the historical transport layer throughput may be used by prediction module to train and/or tune the SVM model described above. The historical transport layer throughput information may be stored as history data 214 in storage facility 208 of media server subsystem 102.

As an example of using historical transport layer throughput to predict transport layer throughput, historical transport layer throughput information may indicate a pattern of network connection 108 becoming more congested each weekday evening around 5:00 pm. This may be due to any of a variety of reasons, such as a number of people returning to their homes after work and using computing devices at their homes in ways that increases the congestion of network connection 108.

Prediction module 204 may be configured to use this historical information to predict transport layer throughput. For example, a user of client device 104 may start streaming a media program from media server subsystem 102 at 4:00 pm on a Friday. The media program may have a duration of two hours. From 4:00-5:00 pm, network conditions may be such that adaptation module 206 selects a higher quality version of the media program (e.g., version 302-1) for progressive download to client device 104. Prediction module 204 may use historical throughput information to predict that at 5:00 pm network congestion will increase such that predicted transport layer throughput will decrease. Prediction module 204 provides information indicating the predicted 5:00 pm transport layer throughput to adaptation module 206 for use by the adaptation module 206 in selecting which version of the media program to stream at 5:00 pm. In certain examples, adaptation module 206 may select a lower quality version of the media program (e.g., version 302-2) for progressive download to client device 104 beginning at 5:00 pm. In response to the selection, at 5:00 pm, streaming facility 202 may seamlessly transition from downloading the higher quality version to downloading the lower quality version of the media program. The transition may be made predictively rather than reactively in an effective rate adaptation time.

The historical transport layer throughput used by prediction module 204 to predict further transport layer throughput may be specific to any period of time. For example, the historical transport layer throughput may be specific to an adaptive HTTP media streaming session (e.g., only historical throughput during the session is used). As another example, the historical transport layer throughput may be specific to a time in history predefined to be associated with a time of an adaptive HTTP media streaming session. For example, a time in history that is likely to have transport layer throughput that is similar to that at the time of the session may be predefined to be associated with the time of the session. For instance, the time in history may include a time that is one day or one week prior to the time of the session because the same time a day or week previous to the session may be likely to have similar transport layer throughput for network connection 108.

In certain examples, prediction module 204 may be configured to base a prediction of transport layer throughput on a combination of current network condition information and historical transport layer throughput information. This may allow prediction module 204 to provide an accurate prediction of transport layer throughput in stable network conditions and to quickly detect changes in network conditions (e.g., sudden network congestion level shifts), which will trigger prompt and effective rate adaptation by adaptation module 206.

Adaptation module 206 may be configured to use predicted transport layer throughput information received from prediction module 204 to dynamically select which version of a next predefined segment of a media program to download to client device 104. A selection by adaptation module 206 may include using the predefined rate adaptation heuristic represented by adaptation heuristic data 216. The heuristic may specify a correlation between predicted transport layer throughput and a particular version of the next predefined segment of the media program. Accordingly, for a given predicted transport layer throughput received from prediction module 204, adaptation module 206 may select an appropriate version of the next predefined segment of the media program for download to client device 104.

Additionally or alternatively, adaptation module 206 may be configured to use parameter information received from client device 204 as described above to dynamically select which version of a next predefined segment of a media program to download to client device 104. A selection by adaptation module 206 may include using the predefined rate adaptation heuristic represented by adaptation heuristic data 216. The heuristic may specify a correlation between parameter information received from client device 104 and a particular version of the next predefined segment of the media program. Accordingly, for given parameter information received from client device 104, adaptation module 206 may select an appropriate version of the next predefined segment of the media program for download to client device 104.

In certain implementations, the heuristic may specify a correlation between both parameter information and historical transport layer throughput and a version of the next predefined segment of the media program. Accordingly, for given parameter information received from client device 104 and a given predicted transport layer throughput received from prediction module 204, adaptation module 206 may select an appropriate version of the next predefined segment of the media program for download to client device 104.

In certain examples, media server subsystem 102 may be configured to use profile information for a user and/or device as a basis for dynamically selecting a version of a next predefined segment of a media program for download. For example, media server subsystem 102 may be configured to maintain or access profile information (e.g., from a network service provider) that specifies one or more HTTP streaming preferences of a user (e.g., that continuous uninterrupted playback is more important to the user than high resolution video) and/or historical HTTP streaming information of a user and/or client device (e.g., information that indicates that historically the user and/or client device has successfully downloaded video having a particular resolution and/or bit rate and/or that historically the user frequently jumps playback forward in a media program). Such profile information may be used by media server subsystem 102, alone or in combination with other information, to select versions of predefined segments of a media program to download during an adaptive HTTP media streaming session.

While certain examples described herein are directed to media server subsystem 102 selecting between different quality versions of predefined segments of a media program for download to client device 104, in other examples any of the factors described herein and upon which such a selection may be made may be used by media server subsystem 102 to select between different sources of the media program. For example, media server subsystem 102 may include media servers located at different geographic locations. A first of the media servers may download predefined segments of the media program to client device 104 during an adaptive HTTP streaming session. During the session, a network connection between the first media server and client device 104 may experience or be predicted to experience congestion. In response, media server subsystem 102 may transition from the first media server downloading predefined segments of the media program to client device 104 to a second media server downloading predefined segments of the media program to client device 104 during the adaptive HTTP streaming session. Such a transition to another source of the media program may be performed seamlessly, may be in response to any of the selection factors described herein, and/or may support a quality user experience.

Figure 8:
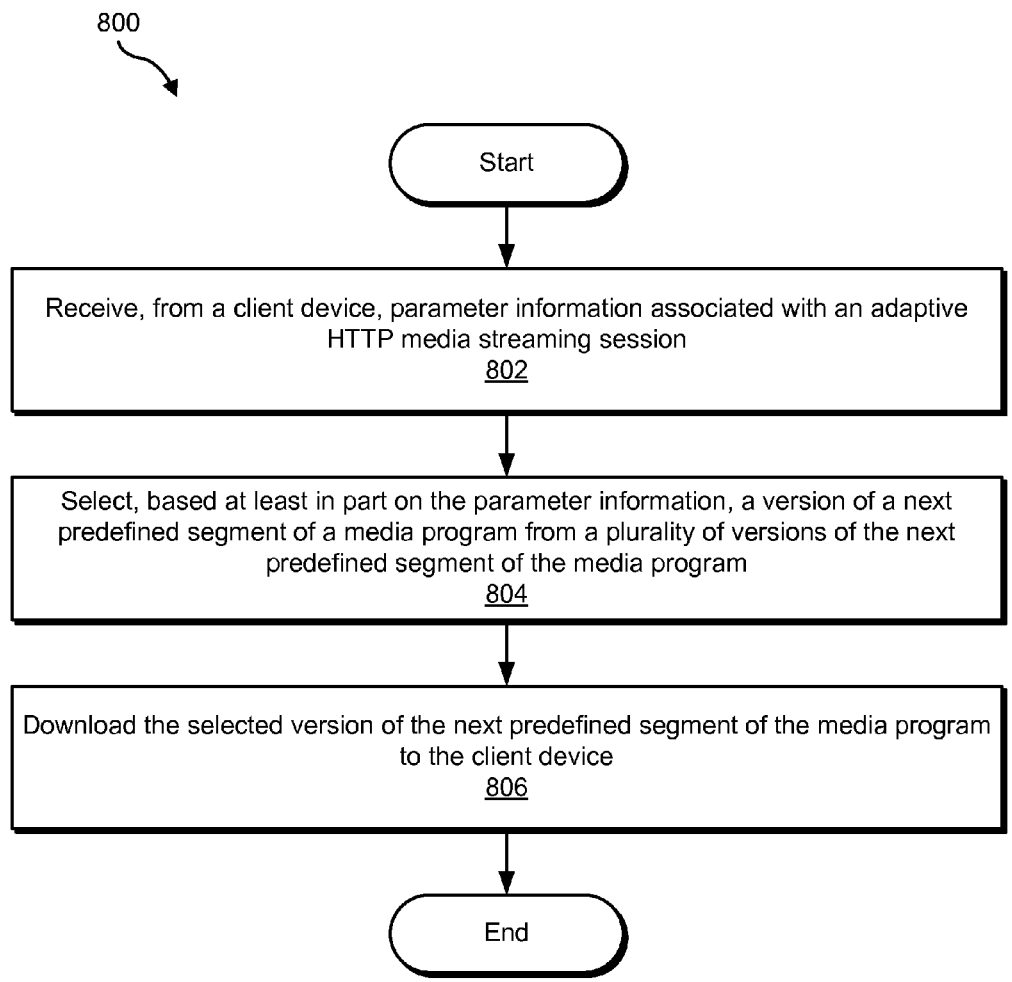
FIGS. 8-10 illustrate exemplary adaptive HTTP media streaming methods according to principles described herein.
Figure 9:
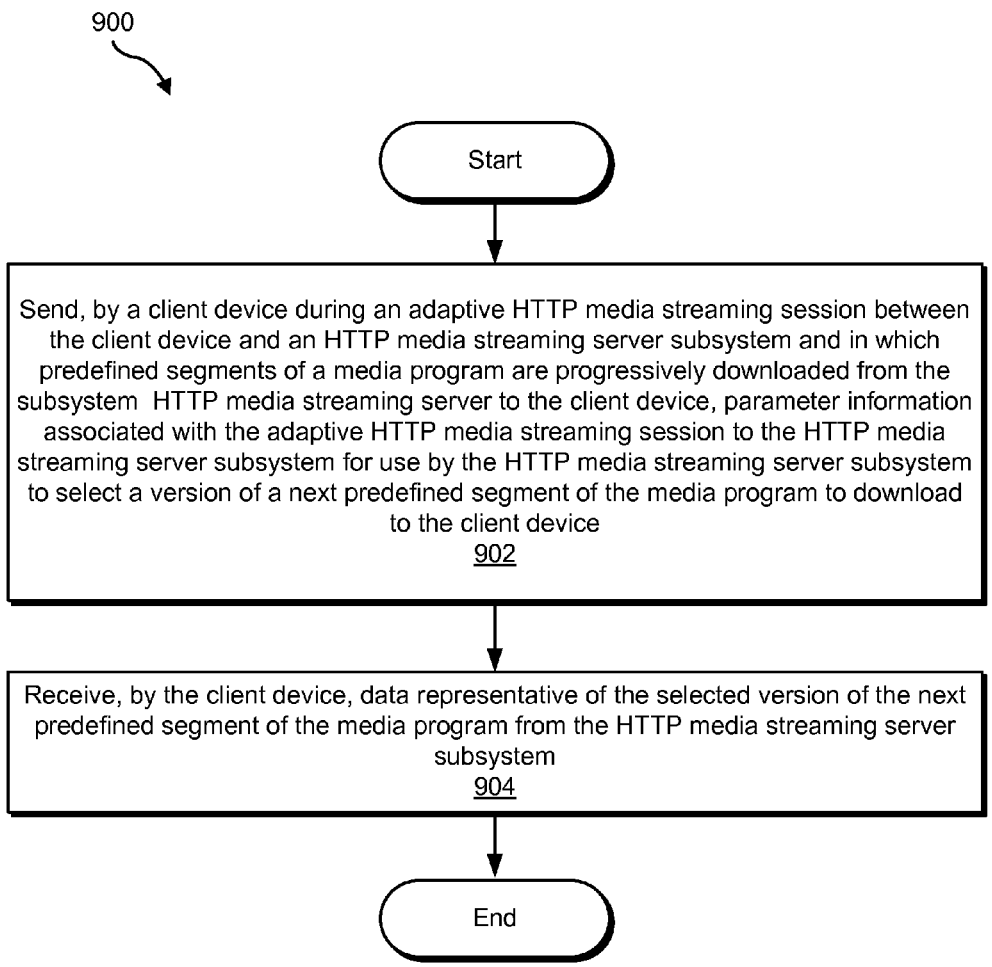
Figure 10:
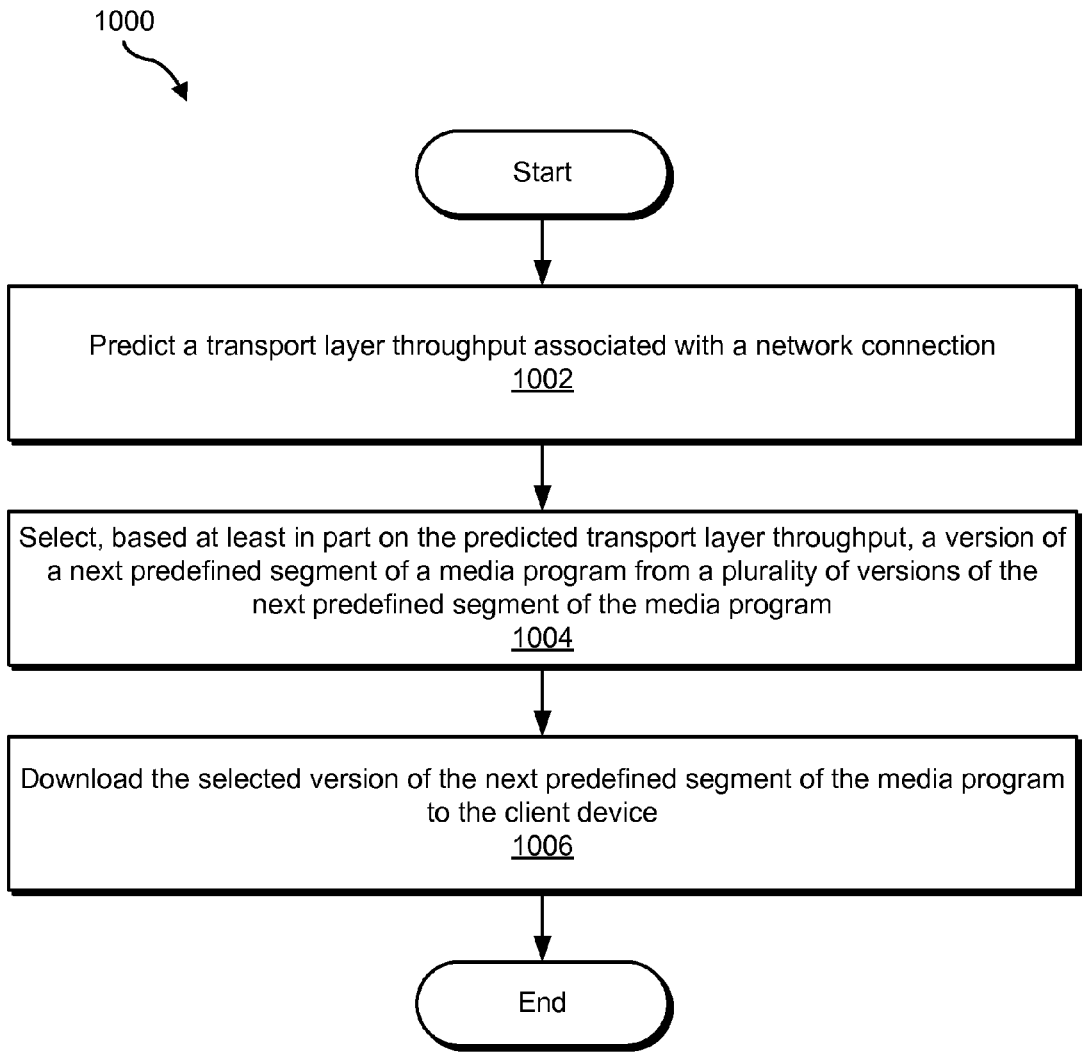

FIGS. 8-10 illustrate exemplary adaptive HTTP media streaming methods 800-1000. While FIGS. 8-10 illustrate exemplary steps according to certain embodiments, other embodiments may omit, add to, reorder, combine, and/or modify any of the steps shown in FIGS. 8-10. One or more of the steps shown in FIGS. 8-10 may be performed by system 100 and/or any component(s) thereof during an adaptive HTTP media streaming session.

Turning to FIG. 8, in step 802 of method 800, an HTTP media streaming server subsystem such as media server subsystem 102 receives, from a client device, parameter information associated with an adaptive HTTP media streaming session between the HTTP media streaming server subsystem and the client device, such as described herein.

In step 804, the HTTP media streaming server subsystem selects, based at least in part on the parameter information received from the client device in step 802, a version of a next predefined segment of a media program from a plurality of versions of the next predefined segment of the media program, such as described herein.

In step 806, the HTTP media streaming server subsystem downloads the selected version of the next predefined segment of the media program to the client device, such as described herein.

Turning to FIG. 9, in step 902 of method 900, a client device sends parameter information associated with an adaptive HTTP media streaming session to an HTTP media streaming server subsystem such as media server subsystem 102 for use by the HTTP media streaming server subsystem to select a version of a next predefined segment of the media program to download to the client device, such as described herein.

In step 904, the client device receives data representative of the selected version of the next predefined segment of the media program from the HTTP media streaming server subsystem.

One or more steps of methods 800 and 900 may be performed concurrently in a closed loop configuration of system 100.

Turning to FIG. 10, in step 1002 of method 1000, an HTTP media streaming server subsystem such as media server subsystem 102 predicts a transport layer throughput associated with a network connection, such as described herein.

In step 1004, the HTTP media streaming server subsystem selects, based at least in part on the predicted transport layer throughput, a version of a next predefined segment of a media program from a plurality of versions of the next predefined segment of the media program, such as described herein.

In step 1006, media server subsystem 102 downloads the selected version of the next predefined segment of the media program to the client device, such as described herein.

One or more steps of methods 800-1000 may be repeated as versions of predefined segments of a media program are progressively selected and downloaded to a client device during an adaptive HTTP media streaming session between the client device and the HTTP media streaming server subsystem.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
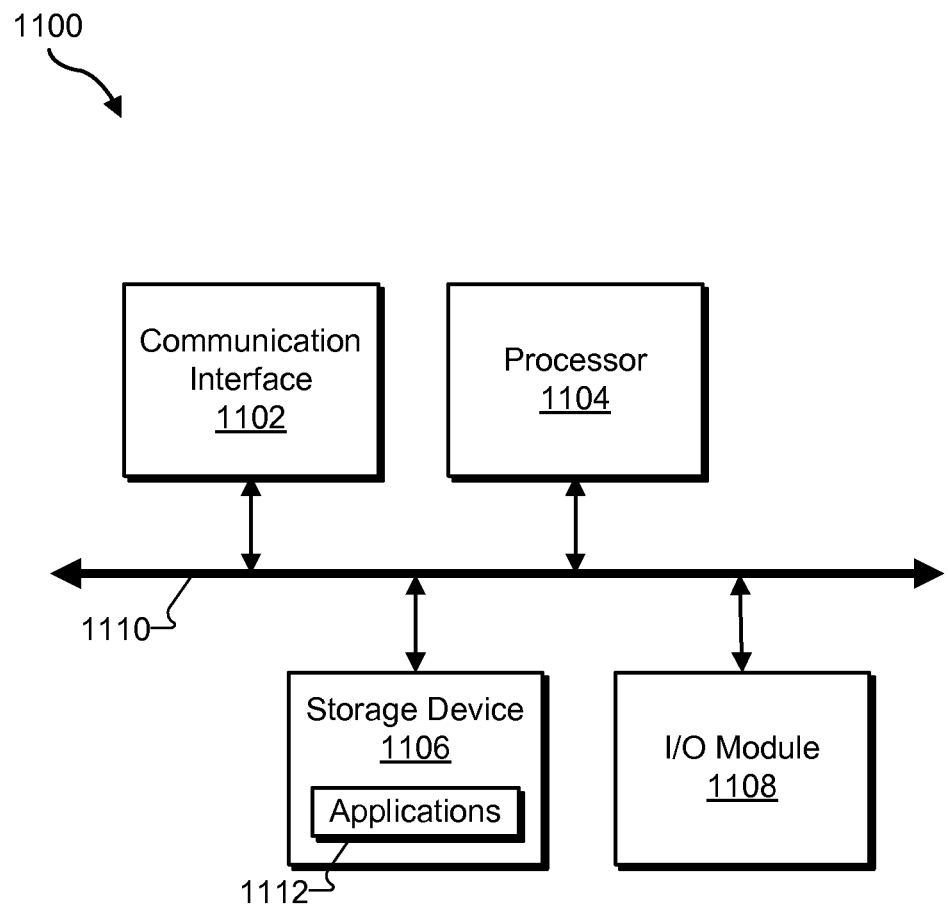
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106.

For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, subsystems, facilities, and/or modules described herein may be implemented by or within one or more components of computing device 1100. For example, one or more applications 1112 residing within storage device 1106 may be configured to direct processor 1104 to perform one or more processes or functions associated with media streaming facility 202 or media player facility 502. Likewise, storage facility 208 or storage facility 508 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a Hypertext Transfer Protocol ("HTTP") media streaming server subsystem from a client device during an adaptive HTTP media streaming session between the HTTP media streaming server subsystem and the client device and in which predefined segments of a media program are progressively downloaded from the HTTP media streaming server subsystem to the client device by way of a network connection, parameter information associated with the adaptive HTTP media streaming session;
   selecting, by the HTTP media streaming server subsystem based at least in part on the parameter information received from the client device, a version of a next predefined segment of the media program from a plurality of versions of the next predefined segment of the media program; and
   downloading, by the HTTP media streaming server subsystem during the adaptive HTTP media streaming session, the selected version of the next predefined segment of the media program to the client device.

2. The method of claim 1, wherein the parameter information received by the HTTP media streaming server subsystem from the client device comprises buffer state information indicating a buffer level of a buffer used by the client device to buffer data representative of the predefined segments of the media program progressively downloaded to the client device during the adaptive HTTP media streaming session.

3. The method of claim 2, wherein the buffer level comprises an amount of buffer memory between a download position and a playback position of the buffer.

4. The method of claim 1, wherein the parameter information received by the HTTP media streaming server subsystem from the client device comprises endpoint-to-endpoint network performance information determined by the client device.

5. The method of claim 1, wherein the endpoint-to-endpoint network performance information indicates at least one of a packet delay, a packet loss, and transport layer window sizes between the HTTP media streaming server subsystem and the client device during the adaptive HTTP media streaming session.

6. The method of claim 1, wherein the parameter information received by the HTTP media streaming server subsystem from the client device comprises playback information determined by the client device and associated with the adaptive HTTP media streaming session.

7. The method of claim 1, further comprising:
predicting, by the HTTP media streaming server subsystem during the adaptive HTTP media streaming session between the HTTP media streaming server subsystem and the client device, a transport layer throughput associated with the network connection;
wherein the selecting of the version of the next predefined segment of the media program is further based on the predicted transport layer throughput associated with the network connection.

8. The method of claim 7, wherein the predicting comprises:
determining performance information for the network connection; and
using the performance information for the network connection to predict the transport layer throughput associated with the network connection.

9. The method of claim 8, wherein the performance information indicates at least one of a packet loss and a packet delay measured by the HTTP media streaming server subsystem.

10. The method of claim 8, wherein:
the performance information indicates at least one of a packet loss and a packet delay measured by at least one network device disposed along the network connection between the HTTP media streaming server subsystem and the client device; and
the determining comprises receiving, from the at least one network device, data representative of the at least one of the packet loss and the packet delay measured by the at least one network device.

11. The method of claim 8, wherein the predicting further comprises:
maintaining data representative of a transport layer throughput history associated with the network connection; and
using the data representative of the transport layer throughput history to predict the transport layer throughput associated with the network connection.

12. The method of claim 1, wherein the selecting comprises using a predefined rate adaptation heuristic that specifies a correlation between the parameter information received from the client device and the version of the next predefined segment of the media program to select the version of the next predefined segment of the media program.

13. The method of claim 1, embodied as computer-executable instructions on at least one non-transitory computer-readable medium.

14. A method comprising:
predicting, by a Hypertext Transfer Protocol ("HTTP") media streaming server subsystem during an adaptive HTTP media streaming session between the HTTP media streaming server subsystem and a client device and in which predefined segments of a media program are progressively downloaded from the HTTP media streaming server subsystem to the client device by way of a network connection, a transport layer throughput associated with the network connection;
selecting, by the HTTP media streaming server subsystem based at least in part on the predicted transport layer throughput associated with the network connection, a version of a next predefined segment of the media program from a plurality of versions of the next predefined segment of the media program; and
downloading, by the HTTP media streaming server subsystem during the adaptive HTTP media streaming session, the selected version of the next predefined segment of the media program to the client device.

15. The method of claim 14, wherein the predicting comprises:
determining performance information for the network connection; and
using the performance information for the network connection to predict the transport layer throughput associated with the network connection.

16. The method of claim 15, wherein the performance information indicates at least one of a packet loss and a packet delay measured by the HTTP media streaming server subsystem.

17. The method of claim 15, wherein:
the performance information indicates at least one of a packet loss and a packet delay measured by at least one of:
a network device disposed along the network connection between the HTTP media streaming server subsystem and the client device, and
an additional client device that shares at least some of the resources of the network connection with the client device; and
the determining comprises receiving, from at least one of the network device and the additional client device, data representative of the at least one of the packet loss and the packet delay.

18. The method of claim 15, wherein:
the performance information indicates at least one of an endpoint-to-endpoint packet loss and an endpoint-to-endpoint packet delay measured by the client device; and
the determining comprises receiving, from the client device, data representative of the at least one of the endpoint-to-endpoint packet loss and the endpoint-to-endpoint packet delay measured by the client device.

19. The method of claim 14, wherein the predicting further comprises:
maintaining data representative of transport layer throughput history associated with the network connection; and using the data representative of the transport layer throughput history to predict the transport layer throughput associated with the network connection.

20. The method of claim 19, wherein the transport layer throughput history associated with the network connection is specific to the adaptive HTTP media streaming session between the HTTP media streaming server subsystem and the client device.

21. The method of claim 19, wherein the transport layer throughput history associated with the network connection is specific to a time that is either one day or one week earlier in time than the adaptive HTTP media streaming session.

22. The method of claim 14, wherein the selecting comprises using a predefined rate adaptation heuristic that specifies a correlation between the predicted transport layer throughput associated with the network connection and the version of the next predefined segment of the media program to select the version of the next predefined segment of the media program.

23. The method of claim 14, embodied as computer-executable instructions on at least one non-transitory computer-readable medium.

24. A method comprising:
sending, by a client device during an adaptive Hypertext Transfer Protocol ("HTTP") media streaming session between the client device and an HTTP media streaming server subsystem and in which predefined segments of a media program are progressively downloaded from the HTTP media streaming server subsystem to the client device, parameter information associated with the adaptive HTTP media streaming session to the HTTP media streaming server subsystem for use by the HTTP media streaming server subsystem to select a version of a next predefined segment of the media program to download to the client device;

wherein the parameter information indicates an amount of buffer memory between a download position and a playback position of a buffer used by the client device to buffer data representative of the predefined segments of the media program progressively downloaded to the client device during the adaptive HTTP media streaming session.

25. A system comprising:
a Hypertext Transfer Protocol ("HTTP") media streaming server subsystem; and
a client device that establishes an adaptive HTTP media streaming session with the HTTP media streaming server subsystem and in which predefined segments of a media program are progressively downloaded from the HTTP media streaming server subsystem to the client device by way of a network connection;
wherein, during the HTTP adaptive HTTP media streaming, the session media streaming server subsystem:
predicts a transport layer throughput associated with the network connection,
receives, from the client device, parameter information associated with the adaptive HTTP media streaming session,
selects, based at least in part on the parameter information received from the client device and on the predicted transport layer throughput associated with the network connection, a version of a next predefined segment of the media program from a plurality of versions of the next predefined segment of the media program, and
downloads the selected version of the next predefined segment of the media program to the client device.

* * * * *